United States Patent
Honkala et al.

(10) Patent No.: US 10,572,447 B2
(45) Date of Patent: Feb. 25, 2020

(54) GENERATING USING A BIDIRECTIONAL RNN VARIATIONS TO MUSIC

(71) Applicant: Nokia Technologies Oy, Espoo (FI)

(72) Inventors: Mikko Honkala, Espoo (FI); Leo Mikko Johannes Kärkkäinen, Helsinki (FI); Akos Vetek, Helsinki (FI); Mathias Berglund, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1007 days.

(21) Appl. No.: 15/081,654

(22) Filed: Mar. 25, 2016

(65) Prior Publication Data
US 2016/0314392 A1    Oct. 27, 2016

Related U.S. Application Data (60) Provisional application No. 62/138,898, filed on Mar. 26, 2015.

(51) Int. Cl.
*G06N 3/04* (2006.01)
*G06F 16/14* (2019.01)

(52) U.S. Cl.
CPC ............. *G06F 16/148* (2019.01); *G06N 3/04* (2013.01)

(58) Field of Classification Search
None
See application file for complete search history.

(56) References Cited

U.S. PATENT DOCUMENTS

| | | | | |
|---|---|---|---|---|
| 5,138,928 A | * | 8/1992 | Nakajima | G10H 1/40 706/18 |
| 5,204,969 A | * | 4/1993 | Capps | G06F 3/165 345/418 |
| 6,051,770 A | * | 4/2000 | Milburn | G10H 1/00 84/611 |
| 6,297,439 B1 | | 10/2001 | Browne | |
| 7,674,966 B1 | | 3/2010 | Pierce | |
| 2009/0132074 A1 | * | 5/2009 | Yamada | G10H 1/00 700/94 |

(Continued)

OTHER PUBLICATIONS

Wang, Cheng-I., and Shlomo Dubnov. "Guided music synthesis with variable markov oracle." In Tenth Artificial Intelligence and Interactive Digital Entertainment Conference. 2014. (Year: 2014).*

(Continued)

*Primary Examiner* — Alexey Shmatov
*Assistant Examiner* — Casey R. Garner
(74) *Attorney, Agent, or Firm* — Mintz Levin Cohn Ferris Glovsky and Popeo, P.C.

(57) ABSTRACT

Methods and apparatus, including computer program products, are provided for receiving, at a bidirectional recurrent neural network, a music file preprocessed to include at least one token data inserted within at least one location in the music file in order to enable varying the music file; generating, by the bidirectional recurrent neural network, an output music file, wherein the bidirectional recurrent neural network generates music data to replace the at least one token data; and providing, by the bidirectional recurrent neural network, the output music file representing a varied version of the music file. Related apparatus, systems, methods, and articles are also described.

18 Claims, 5 Drawing Sheets

(56) References Cited

U.S. PATENT DOCUMENTS

2014/0058735 A1    2/2014   Sharp
2015/0326688 A1   11/2015   Aarnio et al.

OTHER PUBLICATIONS

Marchi, Erik, et al. "Multi-resolution linear prediction based features for audio onset detection with bidirectional LSTM neural networks." In 2014 IEEE international conference on acoustics, speech and signal processing (ICASSP), pp. 2164-2168. IEEE, 2014 (Year: 2014).*
Franklin, Judy A. "Recurrent neural networks for music computation." INFORMS Journal on Computing 18, No. 3 (2006): 321-338. (Year: 2006).*
Eck, Douglas, and Juergen Schmidhuber. "Finding temporal structure in music: Blues improvisation with LSTM recurrent networks." In Proceedings of the 12th IEEE workshop on neural networks for signal processing, pp. 747-756. IEEE, 2002. (Year: 2002).*
Böck, Sebastian, and Markus Schedl. "Polyphonic piano note transcription with recurrent neural networks." In 2012 IEEE international conference on acoustics, speech and signal processing (ICASSP), pp. 121-124. IEEE, 2012. (Year: 2012).*
Schlüter, Jan, and Sebastian Böck. "Musical onset detection with convolutional neural networks." In 6th international workshop on machine learning and music (MML), Prague, Czech Republic. 2013. (Year: 2013).*
Burr, D. J., and Y. Miyata. "Hierarchical recurrent networks for learning musical structure." In Neural Networks for Signal Processing III-Proceedings of the 1993 IEEE-SP Workshop, pp. 216-225. IEEE, 1993. (Year: 1993).*
Kalos, Alex. "Modeling MIDI music as multivariate time series." In 2006 IEEE International Conference on Evolutionary Computation, pp. 2058-2064. IEEE, 2006. (Year: 2006).*
Fernández, Jose D., and Francisco Vico. "AI methods in algorithmic composition: A comprehensive survey." Journal of Artificial Intelligence Research 48 (2013): 513-582. (Year: 2013).*
Chen, C-CJ, and Risto Miikkulainen. "Creating melodies with evolving recurrent neural networks." In IJCNN'01. International Joint Conference on Neural Networks. Proceedings (Cat. No. 01CH37222), vol. 3, pp. 2241-2246. IEEE, 2001. (Year: 2001).*
Ishizuka, K. and T. Onisawa, Generation of Variations on Theme Music Based on Impressions of Story Scenes Considering Human's Feeling of Music and Stories, International Journal of Computer Games Technology, 9 pages (2008).
Boulanger-Lewandowski, et al., "High-dimensional Sequence Transduction," Proc. ICASSP 38, 5 pages (2012).
Voisin, F., "Playing Live Music Using Artificial Neural Networks," A conference at NeuroArts Festival, Plymouth University, Feb. 11, 2011, 13 pages.
De Mantaras, R., "Making Music with AI: Some examples," IllA-Artificial Intelligence Research Institute. CSIC-Spanish Scientific Research Council. 11 pages (2008).
Berndt et al., "A Survey of Variation Techniques for Repetitive Games Music," Conference: AM '12: Proceedings of the 7th Audio Mostly Conference, Corfu, Greece, 7 pages (2012).
Brakel et.al., "Training energy-based models for time-series imputation." The Journal of Machine Learning Research 14.1 (2013): 2771-2797 (2013).
Eck, D. and J. Schmidhuber, "A first look at music composition using lstm recurrent neural networks," Istituto Dalle Molle Di Studi Sull Intelligenza Artificiale, 11 pages (2002).
El Hihi, S. And Y. Bengio, Y. "Hierarchical recurrent neural networks for long-term dependencies," in NIPS 8. MIT Press. 7 pages (1996).
Graves, A., "Generating sequences with recurrent neural networks," arXiv preprint arXiv:1308.0850 (2013).
Hermans, M. and B. Schrauwen, B., "Training and analysing deep recurrent neural networks," in *Advances in Neural Information Processing Systems*, pp. 190-198 (2013).
Hochreiter, S. and J. Schmidhuber, "Long short-term memory," Neural computation 9(8):1735-1780 (1997).
Martens, J., Deep learning via Hessian-free optimization. In Proceedings of the 27th International Conference on Machine Learning (ICML-10), pp. 735-742 (2010).
Pascanu et al., "On the difficulty of training recurrent neural networks," In *Proceedings of The 30th International Conference on Machine Learning* pp. 1310-1318 (2013b).
Pascanu et al., "How to Construct Deep Recurrent Neural Networks", ICLR 2014, 13 pages (2014).
Schmidhuber, J., "Learning complex, extended sequences using the principle of history compression," Neural Computation, (4):234-242 (1992).
Schuster, M. and K. Paliwal, "Bidirectional recurrent neural networks," Signal Processing, IEEE Transactions on , 45(11):2673-2681 (1997).
Pascanu et al., "How to Construct Deep Recurrent Neural Networks," arXiv preprint arXiv:1312.6026, 13 pages (2013a).

* cited by examiner

GENERATING USING A BIDIRECTIONAL RNN VARIATIONS TO MUSIC

CROSS REFERENCE TO RELATED APPLICATIONS

This application claims the benefit of U.S. Provisional Application 62/139,898, filed Mar. 26, 2015, and entitled "GENERATING USING A BIDIRECTIONAL RNN VARIATIONS TO MUSIC." The contents of which are incorporated herein by reference in their entirety for all purposes.

FIELD

The subject matter disclosed herein relates to machine learning and music.

BACKGROUND

Neural-based data processing may be implemented based on a variety of neural models defining the behavior of neurons, dendrites, and/or axons. In some instances, neural-based data processing may be implemented using an immense numbers of parallel neurons and connections between those neurons. This parallel nature of neural-based processing makes it well suited for processing tasks, such as for example data processing, signal processing, prediction, classification, and the like.

SUMMARY

In some example embodiments, methods and apparatus, including computer program products, are provided for receiving, at a bidirectional recurrent neural network, a music file preprocessed to include at least one token data inserted within at least one location in the music file in order to enable varying the music file; generating, by the bidirectional recurrent neural network, an output music file, wherein the bidirectional recurrent neural network generates music data to replace the at least one token data; and providing, by the bidirectional recurrent neural network, the output music file representing a varied version of the music file.

In some example embodiments, one of more variations may be made as well as described in the detailed description below and/or as described in the following features. The at least one location of the at least one data token may be varied. Based on the at least one location of the at least one data token, another output music file may be generated, wherein the other output music file represents another varied version of the music file. The at least one location may be received from a user interface at a user equipment. The output music file may represent the varied amplitude, pitch, timing, rhythm, melody, or timbre of the music file. The bidirectional recurrent neural network may include a first hidden layer configured to process backward states of an input music file, and a second hidden layer configured to process forward states of the input music file. The at least one parameter may be received to configure the bidirectional recurrent neural network, wherein the at least one parameter may be obtained as part of a training phase during which a neural network trains to replace gaps in music with varied music. The at least one token data may include at least one of a value or a character representative of noise in the music file. To control variation, the output music file may be mixed with the music file, wherein the music file represent the original music file without preprocessing to include the at least one token data. The mixing may include replacing one or more values in the output music file with corresponding values from the original music file.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Like labels are used to refer to same or similar items in the drawings.

DETAILED DESCRIPTION

Repetitive music can be very annoying. For example, if a user is in a call center queue waiting to be serviced, the continuously repeating music can annoy the user waiting in the queue (decreasing the user experience while waiting). Although repeating a tune over and over again may be somewhat annoying, there is also value in using a recognizable tune. For example, a recognizable tune used for queue music (while waiting in a call center queue) or for a ring tone may allow the user to recognize that yes I have reached the right call center or yes I am recognize that ring tone and caller.

In some example embodiments, machine learning may generate variations to music, such as a tune, a song, a ring tone, or other electronic music file. For example, machine learning may be used to generate a variation to an existing music file. The varied music may be used in a variety of settings including elevator music, background music in a call center queue, music in a computer game, a ring tone, and/or in any other setting. This variation to the music file may maintain some recognizable aspects of the music while introducing variations to reduce the likelihood of annoying the listener. To illustrate by way of an example, a user may assign a music file (or portion thereof) as a ring tone to a caller or group of callers. In this example, machine learning may vary the tune, so that the user recognizes the ring tone tune (and thus the caller(s)) but the tune may be varied somewhat each time it is played for example to provide some variation. To illustrate further, a music score of an advertisement may be automatically varied to better attract attention. In yet another example, music may be varied in response to a measurable sensor result or reaching a certain level in a game to provide responsive, interactive auditory environments.

In some example embodiments, a machine learning engine, such as a neural network, may be used to generate the variation in the music.

In some example embodiments, a recurrent neural network may be used to generate the variation in the music. In the case of a recurrent neural network (RNN), a bidirectional recurrent neural network may be implemented as well to generate the variation in the music. When this is the case, the output of the bidirectional recurrent neural network may depend on past and future data values of the music file input, such as MIDI, AIFF, WAV, WMA, MP3, and/or any other data file type include raw audio data. Moreover, the bidirectional recurrent neural network may, in some example embodiments, include a first hidden layer having recurrent connections forward in time and a second hidden layer having recurrent connections back in time.

In some example embodiments, a machine learning engine comprising a RNN, a bidirectional RNN, and/or other types of neural networks, may be trained using a music data file corresponding to a song, a tune, a ring tone, and/or any other type of music. Portions of the training data set may be removed, and the formed gaps may be replaced with token data. In some example embodiments, the token data may correspond to one or more predetermined values, such as values typically not found in the music data file. The machine learning engine may then be trained with an output comprising the original music data file, and an input comprising the training data set including gaps filled with the token data. The machine learning engine, such as the RNN, the bidirectional RNN and/or the like, may then iteratively learn, as part of a training phase, how to fill the gaps in the music.

In some example embodiments, the parameters of the trained machine learning engine may be provided to another machine learning engine to enable generation of varied music. For example, the machine learning engine, such as the RNN, bidirectional RNN and/or the like, may receive as an input a music file, such as another, different music file (when compared to the music used during training). The received music data may be processed by at least having one or more portions removed and replaced with token data. The machine learning engine may then process the input music file (which includes the token data) to generate an output music file, which corresponds to the generated music with variations. By varying the position of the gaps (and thus the position of the token data within the within the input music file), variability can be introduced into the music file output. The variability may take the form of changes in frequency (for example, tone or pitch), changes in amplitude (for example, volume), changes in beat, timing, rhythm, melody, or timbre, and/or any other types of variation. And, this variation may occur at any point of time in the music file.

Before providing additional details with respect to the training phase and music generation phase of the machine learning engine, the following provides example implementations of the RNN. A recurrent neural network refers to an artificial neural network where connections between units form a directed cycle. The cycle creates an internal state of the recurrent neural network that enables the recurrent neural network to exhibit a dynamic, temporal behavior.

Figure 1A:
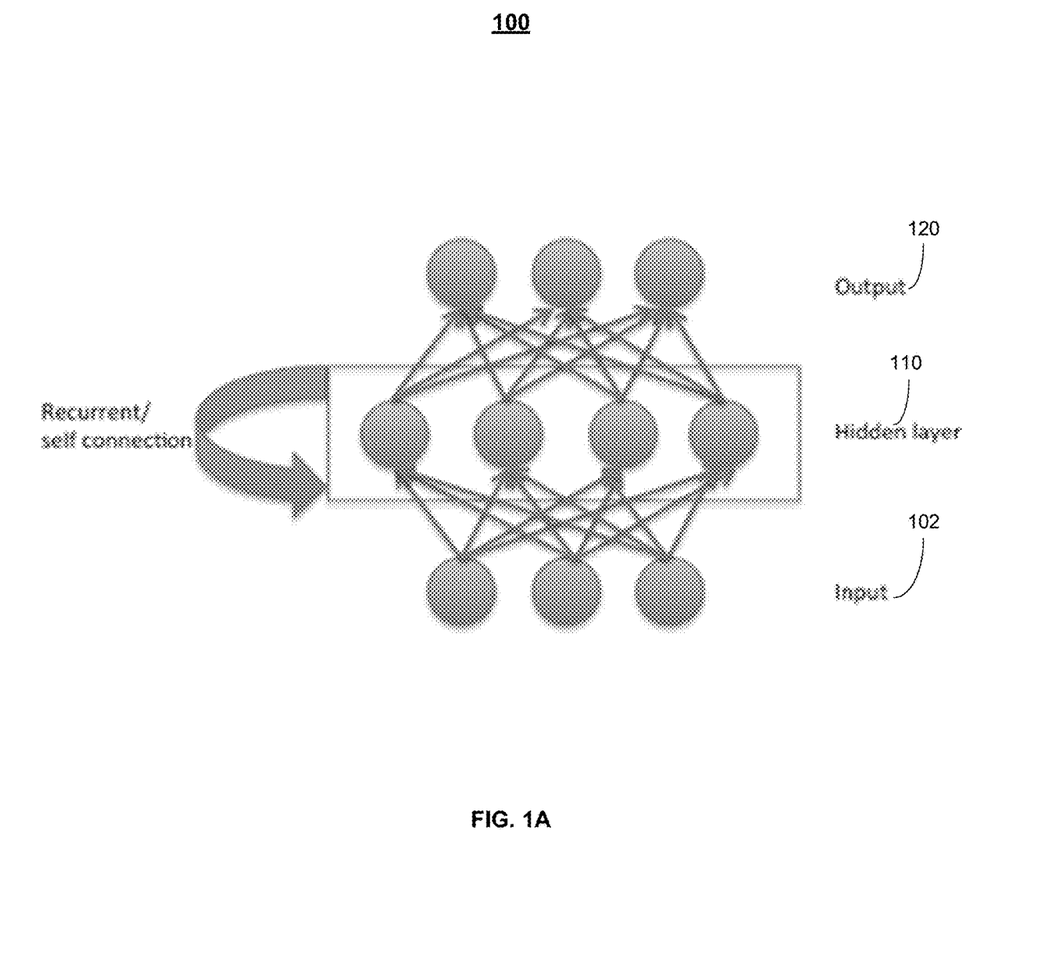
FIG. 1A depicts an example of machine learning engine implemented as a recurrent neural network, in accordance with some example embodiments.

FIG. 1A depicts an example of a recurrent neural network (RNN) 100 including an input layer 102, a hidden layer, and an output layer 120. In the example of FIG. 1A, at least one hidden layer 110 may enable neural network 100 to take into account past states when computing the outputs. For example, a music data file representative of a time sequence of data may be provided to the input layer 102. Each of the nodes of the input layer may receive a data value in this sequence. At a given time step, the inputs may be coupled to the hidden middle layer that generates outputs based on the input values. The neural network may iterate over one or more time steps, so that the output generated by the hidden layer at time step, $t_0$ for example, is used during time step, $t_1$, to compute the next set of outputs, and so forth for each of the time steps until the RNN learns how to fill the gaps (comprising token data) in the input file for example.

Referring to FIG. 1A, the input to a recurrent neural network 100 may be denoted mathematically by $X=\{x_t\}$, wherein $x_t \in R^N$ is an input vector for each time step t. For example, the input vector may correspond to a time sequence of music over time, and this time sequence may include the token data in the gap(s). An output vector for each time step t may be denoted by $Y=\{y_t\}$, wherein $yt \in R^M$ is an output vector for each time step t. The RNN 100 may thus model the distribution P (Y|X). Unsupervised learning may be implemented by letting the RNN predict the next input by setting $Y=\{y_t=x_{t+1}\}$.

In some example embodiments, the RNN 100 may have at least one hidden layer, where the output $y_t$ at a given time step, t, is determined by:

$$y_t = f(W_y h_t + b_y) \quad (1)$$

wherein $$h_t = \tan h(W_h h_{t-1} + W_x x_t + b_h) \quad (2)$$

and, wherein $W_y$, $W_h$, and $W_x$ are the weight matrices connecting the hidden to output layer, hidden to hidden layer, and visible/input to hidden layer, respectively; and by and $b_h$ are the output and hidden layer bias vectors, respectively. The nonlinearity f may be a softmax function (for example, for classification tasks), a sigmoid function (for example, for other binary prediction tasks), although other types of basis function may be used as well. In this form, the RNN 100 may evaluate the output $y_t$ based on information propagated through the hidden layer 110 that directly or indirectly depends on the observations $x_1 \ldots t$.

RNN 100 may be trained with a modified version of a standard backpropagation algorithm, called Backpropagation Through Time (BPTT), although other training techniques may be used as well. In the case of BPTT, a recurrent neural network with one hidden layer (as in FIG. 1A) which is used for n time steps may be seen as a deep feed forward neural network with n hidden layers (where the hidden layers have the same dimensionality and unfolded recurrent weight matrices are identical).

Figure 1B:
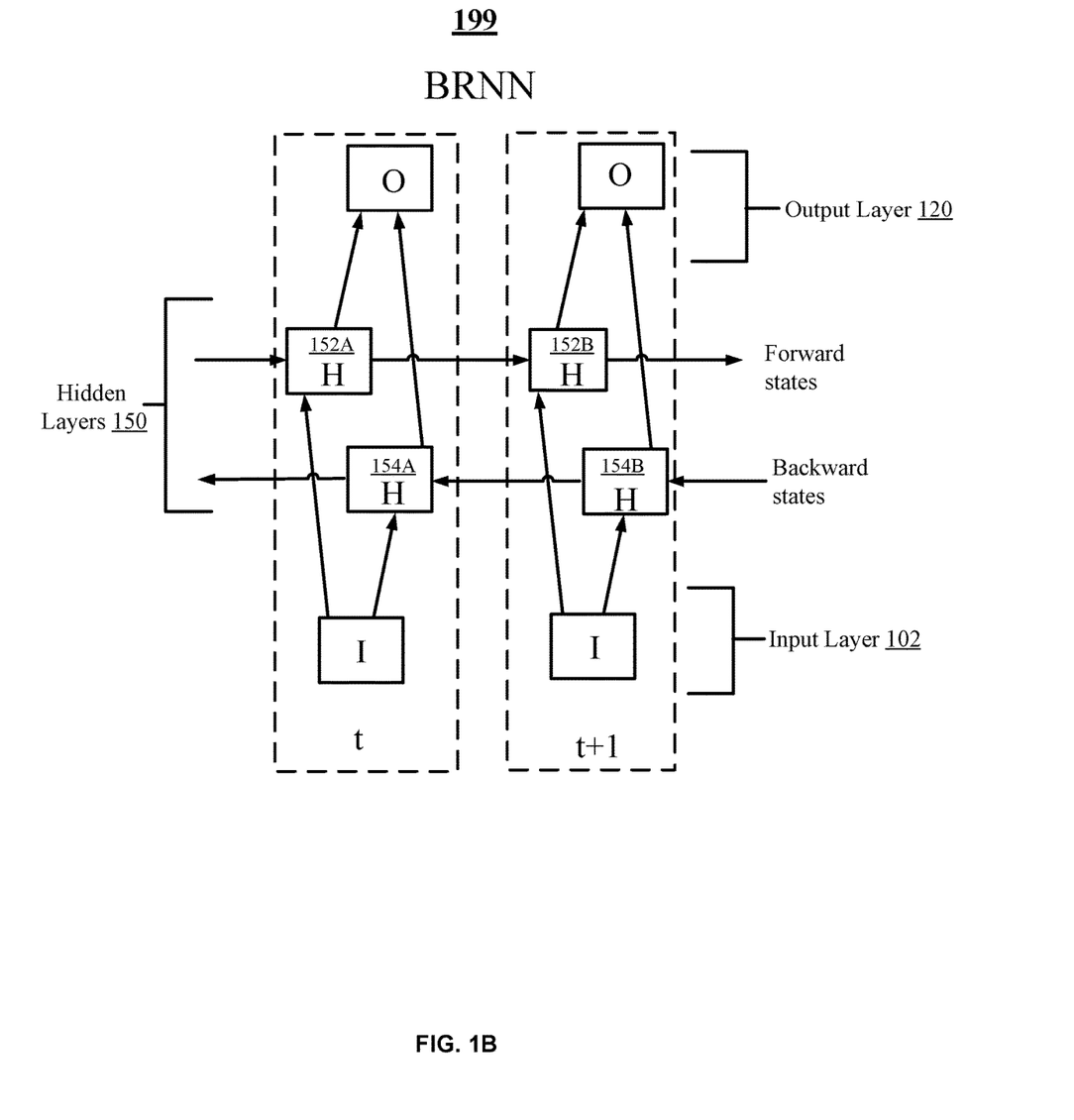
FIG. 1B depicts another example of a machine learning engine implemented as a bi-directional recurrent neural network, in accordance with some example embodiments.

FIG. 1B depicts an example of a bidirectional recurrent neural network 199, in accordance with some example embodiments. In the example of FIG. 1B, the bidirectional neural network includes two hidden layers 150 that take into account past and future values. For some tasks (such as the music variation task example described herein) having access to future values and past values may enhance the performance of the bidirectional RNN, when compared to only having past values. To illustrate further, in the unidirectional RNN of FIG. 1A, portions of the music files may be processed sequentially in temporal order, so the RNN of FIG. 1A may not take into account future context into account (for example, those values after a gap). In the case of the bidirectional RNN of FIG. 1B however, a music file may be processed by the bidirectional RNN forwards and backwards. Specifically, the bidirectional RNN 199 of FIG. 1B may include two separate, recurrent hidden layers 150. The forward states are processed by hidden nodes 152A-B, and the backward states are processed by nodes 154A-B. These two separate, recurrent hidden layers 150 may both be connected to the same output layer 120. This may give the bidirectional RNN symmetric past and future context for every point in the data file, such as the music file used during bidirectional RNN 199 training. In the case of a bidirectional RNN, each training sequence may be presented forward 152A-B and backwards 154B-1 to two separate recurrent hidden layers, both of which are connected to the same output layer 120, as shown in FIG. 1B In the bidirectional RNN 199, it may be represented as a model, in which the output $y_t$ is determined by $$y_t = \text{softmax}(W_y^f h_t^f + W_y^b h_t^b + b_y) \quad (3)$$

wherein $$h_t^f = \tan h(W_h^f h_{t-1} + W_x^f x_t + b_h^f) \quad (4)$$

$$h_t^b = \tan h(W_h^b h_{t+1} + W_x^b x_{t+2} + b_h^b) \quad (5)$$

The notation used in Equations 3-5 is similar to the one-dimensional RNN example of Equations 1-2 above, except the activations and weights are duplicated for forward and backward hidden layers, so the superscript f refers to forward layer and the b superscript refers to the back layer. Since the backward hidden layer may be connected to $x_{t+2}$, no information from $x_{t+1}$ is used to compute the activation $x_t$. We can therefore use the model in an unsupervised manner to predict one time step given all other time steps in the input sequence. Although Equation 3 shows a softmax function, other basis function may be used as well.

Although FIG. 1B depicts an example configuration of a bi-directional RNN, other configurations may be implemented as well (for example, the hidden states may take as input the previous and next time steps as noted in Equations 4 and 5 above).

Regarding deep learning, it refers to a deep, hierarchical model, which may be exponentially more efficient at representing some functions when compared to a shallow model. In the example RNNs depicted at FIGS. 1A-1B, the depth of RNNs can be increased by for example stacking multiple, recurrent hidden layers on top of each other to exploit efficiencies arising from hierarchical representations.

In the example of FIG. 1B, the network structure may enable a current time step to be predicted based on all the previous and following time steps (or observations) in the time series. The bidirectional RNN may be trained in parallel for the entire time sequence input, such as the music data input to the bidirectional RNN. While training, the bidirectional RNN may have one hidden layer per direction or be deeper as noted above, and the training of the model parameters may be performed with BPTT as noted. In order to avoid an exploding gradients problem, gradient norms may be limited by normalizing all gradients. For outputs with multiple simultaneous activations such as polyphonic music, the output layer may be constructed from stochastic sigmoidal units, although other types of functions may be used as well. For outputs with only a single simultaneous activation, softmax units can be used, although other types of functions may be used as well. The network 199 may be trained using stochastic gradient descent with mini-batches of the training data, although other training methods including hessian-free training may be used as well.

In some example embodiments, the neural networks 100 and 199 may be implemented using at least one processor and at least one memory. For example, the at least one processor may receive (and/or read) input data, such as a music data file from memory and/or a memory buffer/cache. Next, the at least one processor may, based on the input data, compute the first hidden layer outputs 154A-B and second hidden layer outputs in accordance with Equations 4 and 5 above, and the output, $y_t$, at a given time step in accordance with Equation 3. The first hidden layer outputs and the second hidden layer outputs may be saved to memory as well (for example, to enable use during calculation at another time step). The resultant output of the output layer may be provided or sent as output data to memory and/or a memory buffer/cache as well.

Figure 2:
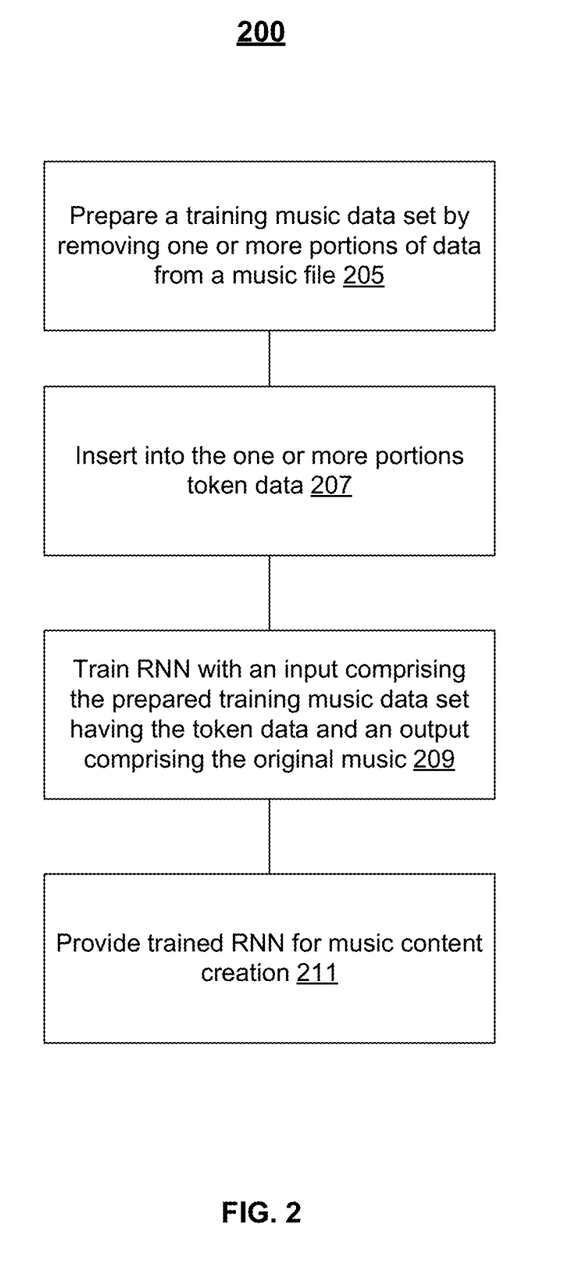
FIG. 2 depicts an example of a training phase, in accordance with some example embodiments.

FIG. 2 depicts an example process 200 for training a bidirectional RNN, in accordance with some example embodiments. Although the description of process 200 refers to the bidirectional RNN 199 of FIG. 1B, other machine learning engines and neural networks including RNN 100 may be used as well.

At 205, a training music data set may be processed by at least removing one or more portions of the music data from the training music data set, in accordance with some example embodiments. For example, the training data set may comprise music which represents a time series of data. When this is the case, one or more portions (or chunks) of data may be removed from the training data set to create gaps in the training data set. For example, in a training music data set having 60 seconds of music, a first gap may be created at 15 seconds to 19 seconds, and a second gap may be created at 23 seconds to 25 seconds, and a third gap may be created at 45 to 49 seconds. Although the previous example refers to three removed portions, other quantities of gaps may be created in the music as well. Moreover, although the previous example refers to non-contagious gaps of training data, the gaps may be contiguous as well. Moreover, in a given chunk of data, not all of the music data may need to be removed. Referring to the third gap above, it may have only seconds 45, 46-47, and 49 removed (or replaced with noise). In some example embodiments, the quantity of gaps/portions may be a predetermined quantity, although the quantity of gaps/portions removed may be selected at random. Moreover, the length of each of the gaps/portions may be a predetermined length, although the lengths may be selected at random as well.

At 207, the removed portions from 205 may be replaced with token data, in accordance with some example embodiments. Referring to the previous example of the training music data set having 60 seconds of music, the first gap may be replaced with a first token data, the second gap with a second token data, and the third gap with a third token data. Moreover, the first, second, and third token data may be the same token data or different. In some example embodiments, the token data may comprise data that may not frequently or typically occur in the training data set to enable detection of the token data in the training data set. In essence, the token data represents "noise" in the training music data set.

At 209, machine learning engine, such as the bidirectional RNN of FIG. 1B, may be trained with an input comprising the training music data set having one or more portions replaced with token data, and with an output comprising the original training data music set (without gaps for example). During training, the machine learning engine or bidirectional RNN may train to predict the output given an input having noise, such as the token data replacing one or more portions of the music file. During training for example, the weights of the bidirectional RNN (for example, w in the equations above) may be adjusted until the bidirectional RNN can predict the output to within a certain degree of error.

At 211, the trained machine learning engine, such as bidirectional RNN 199 including the trained parameters, may be ready for use to vary music, in accordance with some example embodiments. For example, neural network configuration parameters (for example, activation values, weights, basis function being used, and/or the like, for each node of the trained bidirectional RNN) may be saved for use in the generation of music phase. The parameters may be provided to the same or another bidirectional RNN to configure the neural network for the music generation phase, such as the music generation phase described below with respect to FIG. 3.

In some example embodiments, the training phase is repeated with a variety of music inputs. In this way, the trained machine learning engine, such as bidirectional RNN 199 and/or the like, may be generalized to be able to, during the music generation phase, handle different types of music.

The token data may be inserted into the music at random locations in the original music data as well. Moreover, preparation of the music data by inserting the token data may occur for the entire original music data at once, may occur once for every epoch (and then repeated for the whole training data when the training procedure has gone through all the samples), or randomly for each mini-batch before using that mini-batch in the training.

Figure 3:
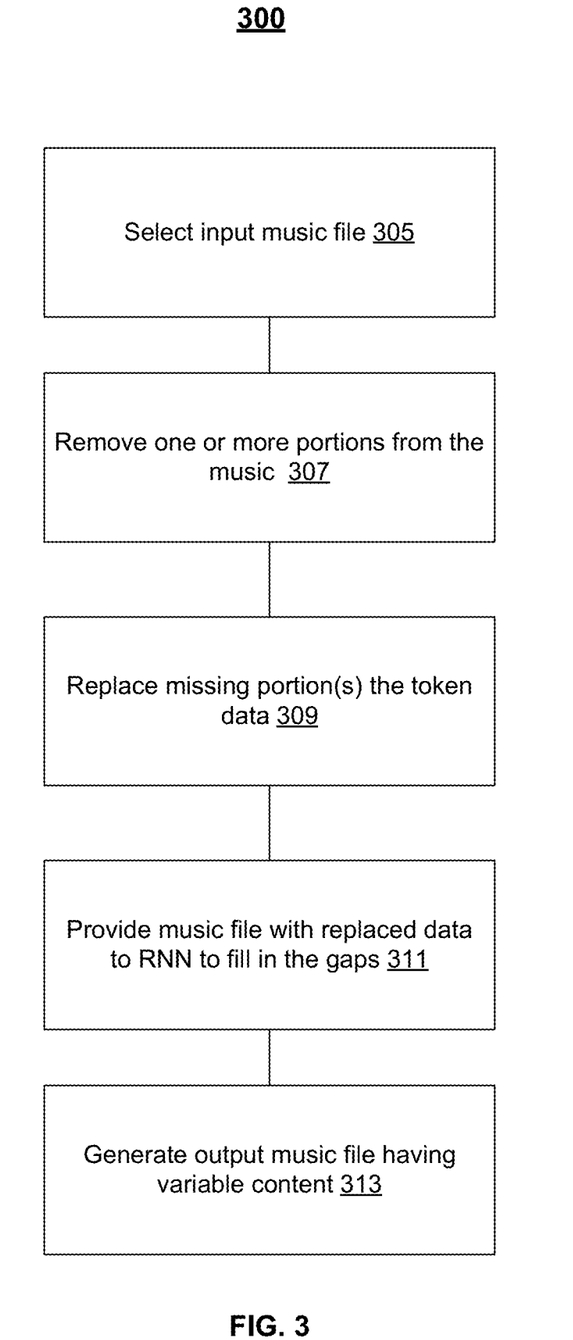
FIG. 3 depicts an example of a generation phase, in accordance with some example embodiments.

FIG. 3 depicts an example process 300 for a music generation phase in which music can be varied, in accordance with some example embodiments. Although the description of process 300 refers to the bidirectional RNN 199 of FIG. 1B, other machine learning engines and neural networks including RNN 100 may be used as well.

At 305, an input music file may be selected for modification, in accordance with some example embodiments. For example, a music file corresponding to a song, a ring tone, and/or the like, may be selected in order to vary the selected music in accordance with some example embodiments.

At 307, the music file selected at 305 may be processed by at least removing one or more portions of the music data from the music file, in accordance with some example embodiments. For example, the music file may represent a time series of music data, in which case one or more portions (or chunks) of data may be removed from the music data to create gaps in the music data.

In some example embodiments, the location of the gaps may be varied in order to enable variation to the original music. For example, a user equipment, such as a cell phone, may allow selection of music, such as a ring tone. The user equipment may allow varying the placement of the gap(s) in the selected music before providing the music to the input layer 102 (FIG. 1B for example). In this way, the output music provided at 120 will vary slightly from the original ring tone. Additional variation may be achieved by varying the position of the gap(s) and then again providing the music/ring tone to the input layer. In some example embodiments, the position of the gaps is selected via a user interface at the user equipment. In other, the gap position may be performed automatically for the user equipment. The gap positions can also be defined by the content creator or redistributor.

In some example embodiments, the quantity of gaps may be the same or similar to what was removed for the training data in 205 above. For example, if three portions/chunks are removed from the training data at 205, then the actual music file being varied during process 300 may also have 3 portions/chunks removed at 307. In training, the system may implement a certain quantity of gaps which should also be the same or similar quantity as in the generation phase (although the gap lengths need not be the exact same length in training and generation phases). Although the previous example refers to three removed portions, other quantities of gaps may be created in the music as well. Moreover, the quantity and/or lengths of the gaps/portions may be a predetermined quantity, although the quantity and/or lengths may be selected at random as well.

At 309, the removed portions from 307 may be replaced with token data, in accordance with some example embodiments. Moreover, the token data may be of the same or similar type as used during the training phase 207. For example, if the data token used during training corresponds to the value 99, then the portions removed at 305 may be replaced with the data token 99, in accordance with some example embodiments. The tokens may comprise data values, or represent non-numerical or categorical data as well.

At 311, the music data file including token data may be provided as an input to the machine learning engine, such as bidirectional RNN 199 and/or the like, in accordance with some example embodiments. For example, the bidirectional RNN 199 may receive at the input layer the music data file with the data tokens inserted as noted at 309. The machine learning engine may then run and generate music to fill in the gaps so the gaps include generated music rather than data tokens.

At 313, the output layer 120 may thus provide the generated music file output that has been varied, in accordance with some example embodiments. For example, the bidirectional RNN may provide an output music data file with the data tokens (which represents noise in the music file) replaced with generated music data.

In some example embodiments, additional variation to the selected music file of 305 may be performed, as noted, by changing position within the music file of the gaps removed 307 and replaced 309. To illustrate further, if a 60 second music file at 305 is input into the RNN with a first gap at 10 seconds into the song and another gap at 35 seconds into the song, the output music at 313 will sound different when compared to placing the first gap at 20 seconds and the second gap at 45 seconds. Since the bidirectional RNN takes into account past and future data in the selected music file, the output music file may fit into the melody of the selected music.

Although some of the examples described herein refer to a bi-directional RNN 199, other types of machine learning engines including other types of neural networks and/or RNNs, such as RNN 100, may be used as well.

In some example embodiments, a set of consecutive time steps may be marked as a gap. From that gap, a random subset of the observations is marked as missing by replacing the input data with a data token, such as a predetermined missing value indicator (for example, by adding one dimension to the input vector, where a value is missing if and only if that final dimension is set to one). The training cost may then be propagated only from the predictions of the time steps marked as a gap. During the generation phase, the observations of the part of the sequence to be generated may be marked with the data token/predetermined missing value indicator. The observations may then be filled by sampling one observation at a time in either in random or a predetermined order. However, each time an observation has been filled in, the hidden layer state activations may be appropriately re-evaluated to accommodate the fact that subsequent gaps that are filled should depend on what has already been filled in so far. The generation may thus be done once all missing values have been filled in.

In some example embodiments, the gaps may correspond to data tokens as noted. Since RNNs may take as input variable length sequences, the input may include a complete song before and after the gaps, which enables the system to generate musical sequences similar to the song at hand.

In some example embodiments, the generated music portion output at 313 may be biased with the original part, so that the effect of the variation can be controlled. For example, the variability of the output music may be controlled by "mixing" the generated output with the original score. This mixing may be performed by replacing one or more values in the generated output (for example, output time steps) with value(s) from the original music. This mixing may also be performed by calculating a value, such as an average value between the generated output and the value in the original music score.

In some example embodiments, a dynamic random access memory (RAM) unit may be implemented in order to enable the RNN to model longer time sequences associated with music. For example, the RNN 100 and/or 199 may include a flash or dynamic RAM at the input layer to enable handling the music file.

In some example embodiments, the variability may be created beforehand for making recognizable variability for the user interface-based sounds. For example, certain types of alerts can convey extra information (for example, context) based on variations of the alert tone. As well, ringing tones could be categorized in hierarchies, so that work calls have a certain type of tone, but individuals would get their own variation. The same applies to computer application (e.g. game) sounds.

Although the previous example refers to using token data as a way to provide variation. Variation in the music may be provided in other ways as well. For example, the output may be modeled as a distribution rather than deterministically having distribution parameters, such as mean and variance, to sample from. To illustrate further, the neural network may output a parameter: the probability of a key being pressed for some time step. The output may then be sampled from this probability. The neural network model may be allowed to generate one sample at a time based on all past samples and use the generated sample as the value for the next time step. In an RNN for example where an initial 10 seconds of music is provided as input, the model may output a probability distribution for the next 1 second, which is sampled from, and added to, the first 10 seconds of music. The process may then be repeated with 11 seconds of music, which gives 12 seconds of music. This may be continued until the desired length is achieved. Moreover, variability may be introduced by adding random noise directly to the input. Furthermore, a restricted Boltzmann machine (RBM) may be used in a windowed approach, in which one or more MCMC (Markov Chain Monte Carlo) steps of the hidden units and the visible units given those hidden units. The RBM may be trained to model 5 seconds of consecutive music, for example. At generation, the visible units of the RBM may be initialized with 5 seconds at some position of the original music and then allowed to run a number of steps of MCMC, so the resulting visible units comprise the generated music. The RBM may, in this example, slowly change the original music, and the amount of change may generally depend on the number of MCMC steps. Some or all of the "fantasy particles" in the visible units after having run the MCMC chain may be used. In addition, stochastic neurons may be used, in some example embodiments, rather than deterministic ones in the hidden layers of the RNN (or any other neural network model). Stochastic neurons may also be implemented by simply adding noise to the input or making the input stochastic (for example, by treating a 1 as 0.9 and a 0 as 0.1 that represents the probability that particular unit is active). In some example embodiments, a non-recurrent feedforward network may be used. When this is the case, the non-recurrent feedforward network may transform an input to an output. This non-recurrent feedforward network may be trained by for example adding some noise to the input, so that the network tries to learn what the original music value was. Moreover, a number of predefined options may also be selected at random. Furthermore, variability may also be controlled by model selection or simply by which time steps are replaced in the original music score.

Figure 4:
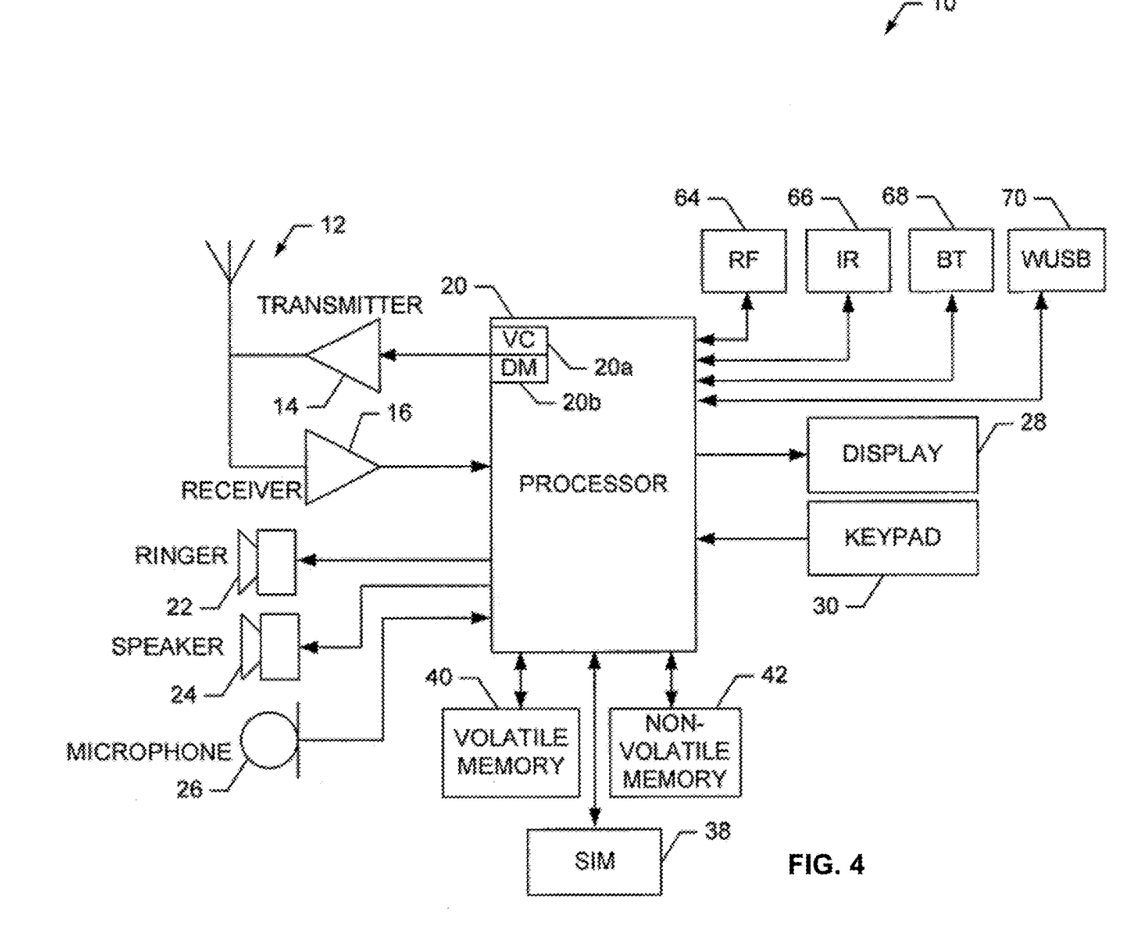
FIG. 4 depicts an example of a radio, in accordance with some example embodiments.

FIG. 4 depicts a block diagram of a radio 400 that may be used at user equipment, such as a smart phone, tablet, a computer, and/or another other radio based device, although non-wireless implementations of the user equipment may be realized as well. In any case, the user equipment may include a processor which can be programmed to vary the music as disclosed herein. Alternatively or additionally, the user equipment may include dedicated circuitry for the music variation processes disclosed herein. Alternatively or additionally, a user interface may be used to select music, while another processor (for example, in the cloud or backend) generates the varied music file, which may be provided via wireless and/or wireless to the user equipment.

The radio may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or any subsequent revisions or improvements to these standards. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions, such as those described with respect to the training and generations phases above. The memories may comprise an identifier, such as an international mobile equipment identification (IMEI) code, capable of uniquely identifying apparatus 10. In the example embodiment, the processor 20 may be configured using computer code stored at memory 40 and/or 42 to perform operations as disclosed herein including receiving, at a bidirectional recurrent neural network, a music file preprocessed to include at least one token data inserted within at least one location in the music file in order to enable varying the music file; generating, by the bidirectional recurrent neural network, an output music file, wherein the bidirectional recurrent neural network generates music data to replace the at least one token data; providing, by the bidirectional recurrent neural network, the output music file representing a varied version of the music file, and/or the like as disclosed herein with respect to process 200 and/or 300 for example.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing herein, a technical effect of one or more of the example embodiments disclosed herein may be generating variations to music, so that it keeps its original character.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), graphical processing units (GPU) and specialized neural computational units, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. A method comprising:
 receiving at least one parameter to configure a bidirectional recurrent neural network, wherein the at least one parameter is obtained as part of a training phase during which the bidirectional recurrent neural network trains to replace gaps in music with varied music; and
 processing, by the bidirectional recurrent neural network, a music file by at least removing at least one portion of music data from the music file, the music file representing a time series of music data and replacing the at least one portion of the music data by the at least one token, the processing further comprising:
   providing the music file to a first hidden layer of the configured bidirectional recurrent neural network and to a second layer of the configured bidirectional recurrent neural network, the first hidden layer operating in forward state and the second hidden layer operating in a backward state, wherein at least the first hidden layer and the second hidden layer provide outputs toward an output layer,
   generating, by the bidirectional recurrent neural network, an output music file, wherein the bidirectional recurrent neural network generates varied music data to replace the at least one token removed from the music file to include in the output music file, and
   providing, by the output layer of the bidirectional recurrent neural network, the output music file.

2. The method of claim 1 further comprising:
 varying at least one location of the at least one token.

3. The method of claim 2 further comprising:
 generating, based on the varied at least one location of the at least one token, another output music file, wherein the other output music file represents another varied version of the music file.

4. The method of claim 2 further comprising:
receiving, from a user interface at a user equipment, the at least one location.

5. The method of claim 1, wherein the output music file represents the varied at least one of timing, rhythm, melody, amplitude, pitch, or timbre.

6. The method of claim 1, wherein the at least one token comprises at least one of a value or a character representative of noise in the music file.

7. The method of claim 1 further comprising:
controlling variation in the output music file by at least mixing the output music file with the music file, wherein the music file represent the original music file without preprocessing to include the at least one token.

8. The method of claim 7, wherein the mixing comprises replacing one or more values in the output music file with corresponding values from the original music file.

9. An apparatus, comprising:
at least one processor; and
at least one memory including computer program code;
the at least one memory and the computer program code configured to, with the at least one processor, cause the apparatus to at least:
receive at least one parameter to configure a bidirectional recurrent neural network, wherein the at least one parameter is obtained as part of a training phase during which the bidirectional recurrent neural network trains to replace gaps in music with varied music; and
process, by the bidirectional recurrent neural network, a music file by at least removing at least one portion of music data from the music file, the music file representing a time series of music data and replacing the at least one portion of the music data by the at least one token, the process of the music file further comprising:
provide the music file to a first hidden layer of the configured bidirectional recurrent neural network and to a second layer of the configured bidirectional recurrent neural network, the first hidden layer operating in forward state and the second hidden layer operating in a backward state, wherein at least the first hidden layer and the second hidden layer provide outputs toward an output layer,
generate, by the bidirectional recurrent neural network, an output music file, wherein the bidirectional recurrent neural network generates varied music data to replace the at least one token removed from the music file to include in the output music file, and
provide, by the output layer of the bidirectional recurrent neural network, the output music file.

10. The apparatus of claim 9, wherein the apparatus is further configured to at least vary at least one location of the at least one token.

11. The apparatus of claim 10, wherein the apparatus is further configured to at least generate, based on the varied at least one location of the at least one token, another output music file, wherein the other output music file represents another varied version of the music file.

12. The apparatus of claim 10, wherein the apparatus is further configured to at least receive, from a user interface at the apparatus, the at least one location.

13. The apparatus of claim 9, wherein the output music file represents the varied at least one of timing, rhythm, melody, amplitude, pitch, or timbre.

14. The apparatus of claim 9, wherein the at least one token comprises at least one of a value or a character representative of noise in the music file.

15. The apparatus of claim 9 wherein the apparatus is further configured to at least control variation in the output music file by at least mixing the output music file with the music file, wherein the music file represent the original music file without preprocessing to include the at least one token data.

16. The apparatus of claim 9, wherein the apparatus is further configured to at least mix by replacing one or more values in the output music file with corresponding values from the original music file.

17. The apparatus of claim 9, wherein the apparatus comprises at least one of a bidirectional recurrent neural network or a user equipment.

18. A non-transitory computer-readable storage medium including code which when executed causes operations comprising:
receiving at least one parameter to configure a bidirectional recurrent neural network, wherein the at least one parameter is obtained as part of a training phase during which the bidirectional recurrent neural network trains to replace gaps in music with varied music; and
processing, by the bidirectional recurrent neural network, a music file by at least removing at least one portion of music data from the music file, the music file representing a time series of music data and replacing the at least one portion of the music data by the at least one token, the processing further comprising:
providing the music file to a first hidden layer of the configured bidirectional recurrent neural network and to a second layer of the configured bidirectional recurrent neural network, the first hidden layer operating in forward state and the second hidden layer operating in a backward state, wherein at least the first hidden layer and the second hidden layer provide outputs toward an output layer,
generating, by the bidirectional recurrent neural network, an output music file, wherein the bidirectional recurrent neural network generates varied music data to replace the at least one token removed from the music file to include in the output music file, and
providing, by the output layer of the bidirectional recurrent neural network, the output music file representing a varied version of the music file.

* * * * *